April 11, 1961 J. P. SELLERS, JR 2,979,353
ELASTOMER BALL JOINT AND METHOD OF ASSEMBLING SAME
Filed Nov. 8, 1956 6 Sheets-Sheet 1
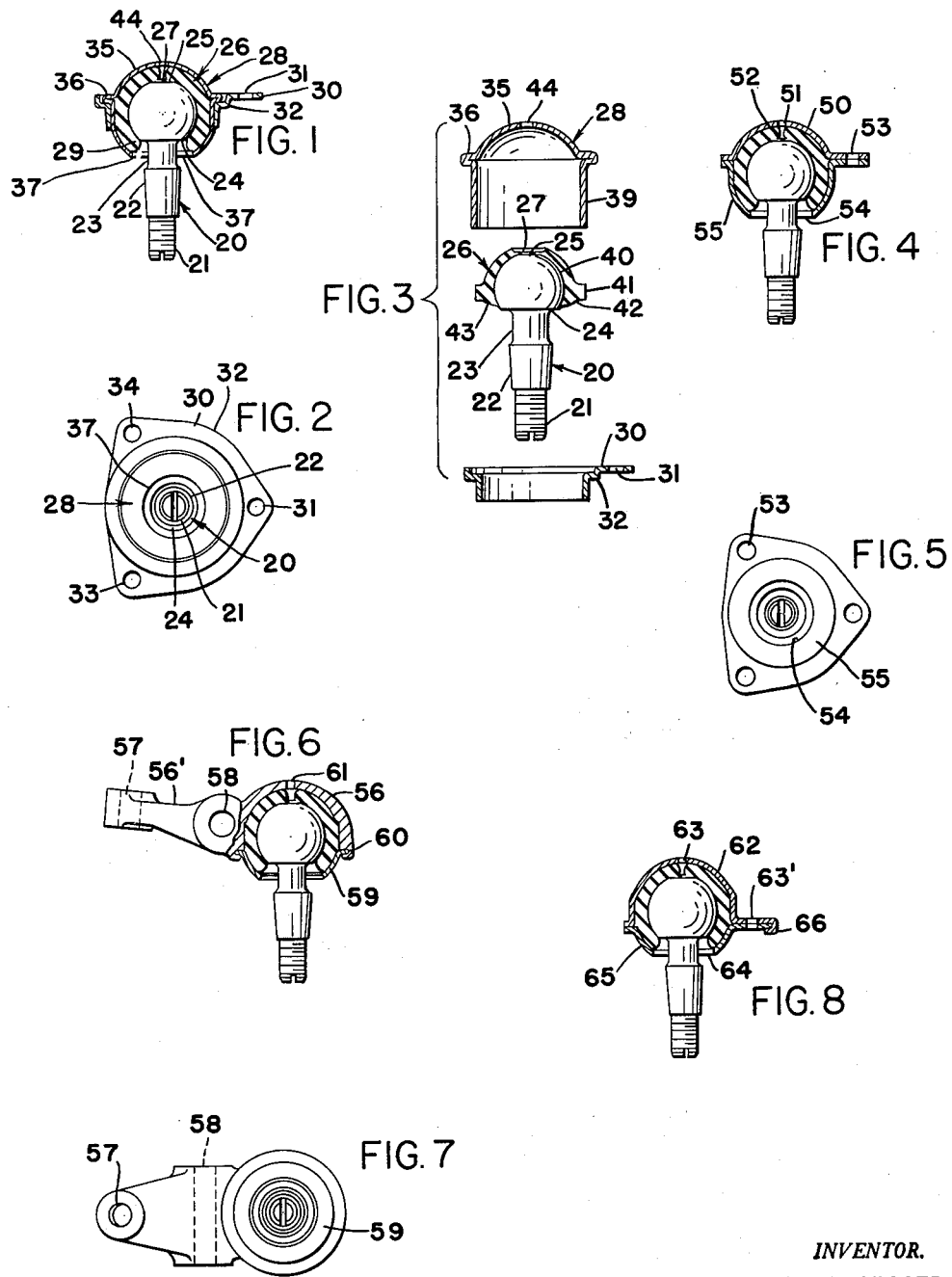
INVENTOR.
JOHN P. SELLERS, JR. DECEASED
BY JEAN W. SELLERS, ADMINISTRATRIX
*Fay & Fay*
ATTORNEYS April 11, 1961  J. P. SELLERS, JR  2,979,353
ELASTOMER BALL JOINT AND METHOD OF ASSEMBLING SAME
Filed Nov. 8, 1956  6 Sheets-Sheet 2

INVENTOR.
JOHN P. SELLERS, JR. DECEASED
BY JEAN W. SELLERS, ADMINISTRATRIX
Fay & Fay
ATTORNEYS

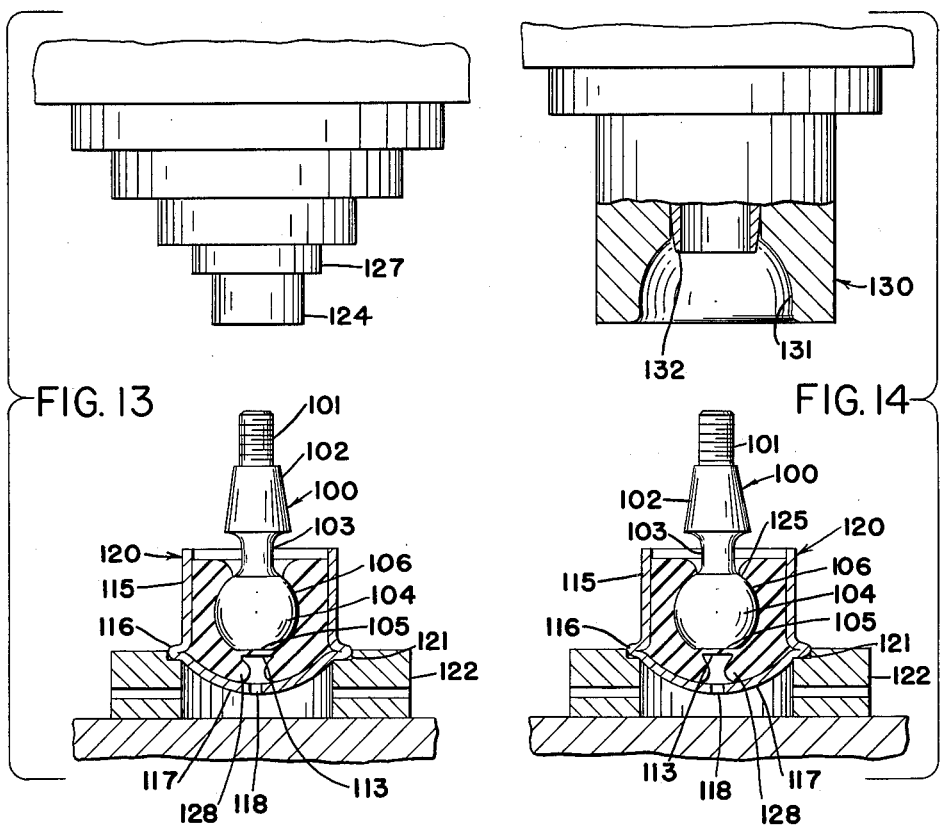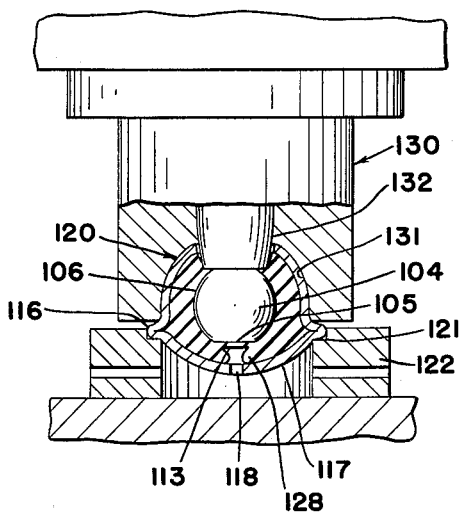

INVENTOR.
JOHN P. SELLERS, JR.
DECEASED
BY JEAN W. SELLERS,
ADMINISTRATRIX
*Fay & Fay*
ATTORNEYS

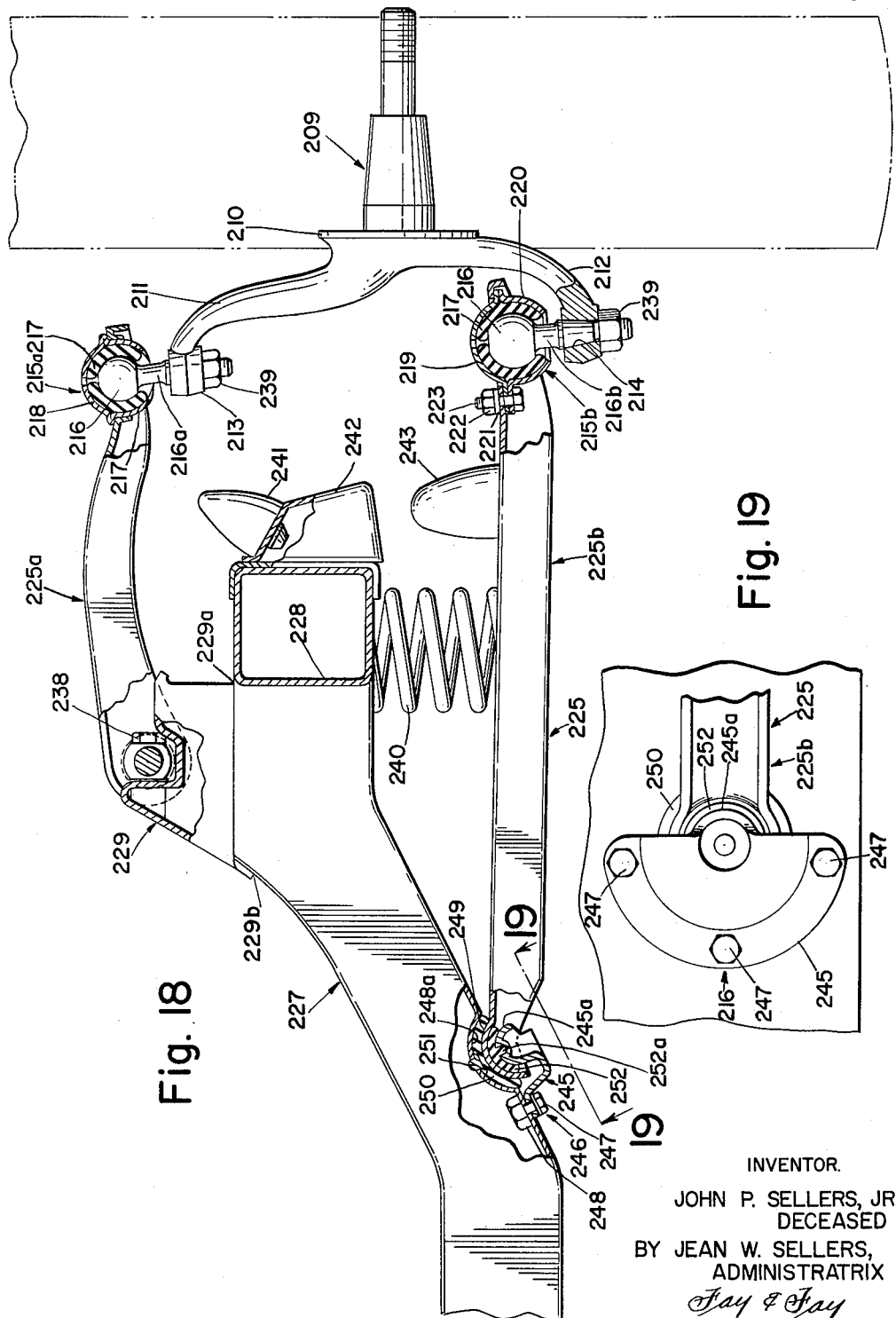

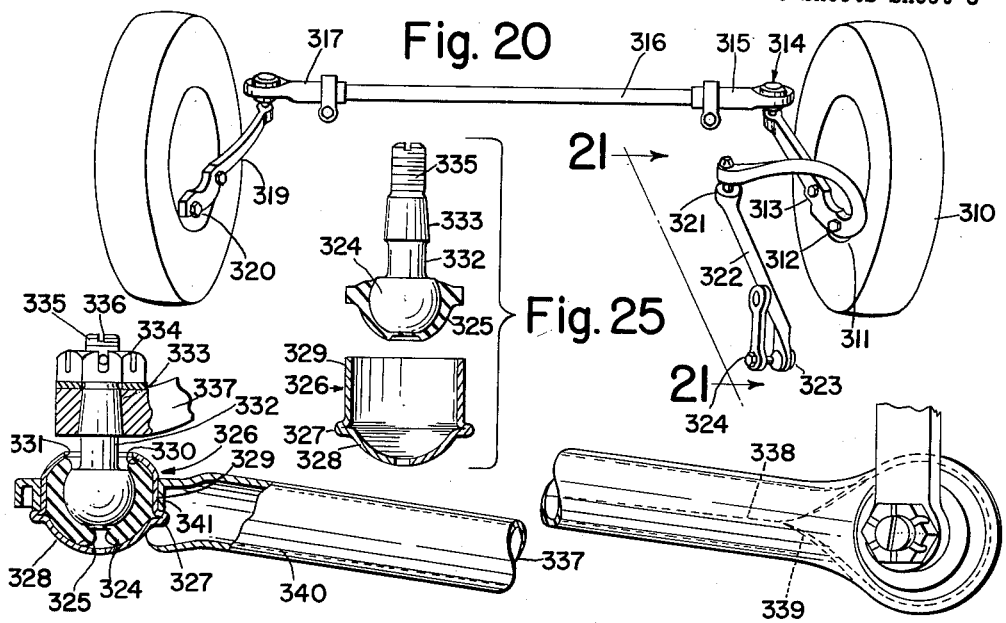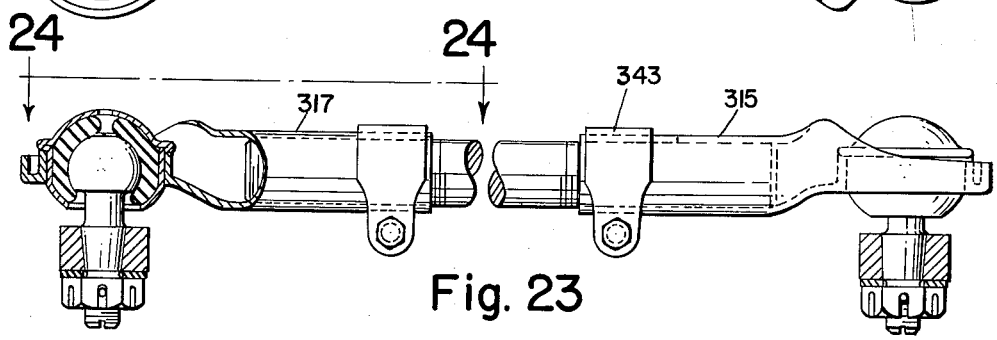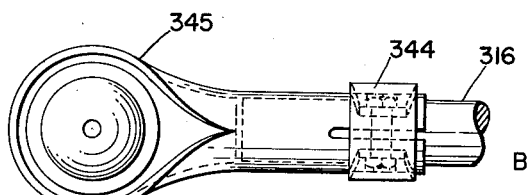

United States Patent Office 2,979,353
Patented Apr. 11, 1961

2,979,353

ELASTOMER BALL JOINT AND METHOD OF ASSEMBLING SAME

John P. Sellers, Jr., deceased, late of Brecksville, Ohio, by Jean W. Sellers, administratrix, Brecksville, Ohio, assignor to Clevite Harris Products, Inc., a corporation of Ohio Filed Nov. 8, 1956, Ser. No. 621,102

11 Claims. (Cl. 287—85)

The present invention relates to elastomer ball joints, and is more particularly directed to improvements in ball and socket type joints and to the method of making such joints.

An object of this invention is to provide in ball and socket type joints and in apparatus for using the same an improvement in which a rubber-like or elastomer covering is bonded to the ball member of the joint so that when the ball member thus covered is disposed within the socket, the elastomer covering or layer is substantially deformed, thereby resiliently interconnecting the socket and ball members.

Another object of the invention is to provide an improvement in such joints in which the deformed elastomer layer disposed between the socket and ball members is adapted to accept all relative movements between the members by the molecular deformation of the rubber.

Still a further object of the invention is the provision of an elastomer covering upon a ball member of such contour and proportioned wall thickness that when operatively secured within a socket housing, the resultant joint will be capable of accepting in the flexing properties of the elastomer very substantial relative angular movement, as, for example, in the order of 90°, without slippage, and when the load or force which occasioned the angular movement is released the ball and socket will tend to return to their initial predetermined positional interrelationship.

Another object of the invention of a very practical nature is the provision of an unsealed elastomer type ball and socket point which requires no lubrication in its operation.

This invention further relates and is directed to a type of ball and socket joint useful in connection with and adapted for front end suspension systems, power steering systems and steering linkage arms and components generally, such as tie rods, drag links, pitman arms, A-frames and the like.

Another object of the invention is the provision in the elastomer layer covering the ball joint of an annular locator flange so disposed and proportioned that when the ball having the elastomer covering thereon is assembled within a socket casing, the elastomer is so displaced that the compression of the rubber in the assembled joint is greater on the stud hemisphere than on the top hemisphere.

Another object is to provide in a joint of this type a degree of circumferential resistance to movement between the surface of the elastomer contacting the ball which will be equal to or greater than the circumferential resistance of the outer elastomer surface to the socket.

Other objects and advantages will become apparent hereinafter when the following specification is read in conjunction with the accompanying drawings.

Fig. 1 is a view, partly in longitudinal section through a preferred form of rubber ball joint showing the socket, the ball, the elastomer layer, the window in the socket and the stud portion;

Fig. 2 is a view from beneath the joint illustrated in Fig. 1;

Fig. 3 is an exploded view showing the parts prior to assembly of said elastomer ball joint;

Fig. 4 is a view similar to that of Fig. 1 with modifications of the socket structure;

Fig. 5 is a view from beneath the joint illustrated in Fig. 4;

Fig. 6 is a view partly in longitudinal section of another form of ball and socket joint with a connector arm shown in relationship thereto;

Fig. 7 is a view from beneath the joint illustrated in Fig. 6;

Fig. 8 is a view partly in longitudinal section of another modification the socket structure may take;

Fig. 13 is a further view showing the ball within the socket;

Fig. 14 is a view of the die member with the closing die ready to advance on the socket;

Fig. 15 is a view showing the socket closed;

Fig. 16 is a final view of the product as formed;

Fig. 18 is a view of the A-frame illustrated in Fig. 17 with the ball joints being shown partly in longitudinal section;

Fig. 19 is a view along the line 19—19 of Fig. 18;

Fig. 20 is a schematic view of the use of the invention in a steering assembly, such as a drag link-tie rod arrangement;

Fig. 21 is a view along the line 21—21 of Fig. 20 broken in the center of the drag link showing the use of the invention therein;

Fig. 22 is a cutaway plan view of the under side of the drag link assembly shown in Fig. 21;

Fig. 23 is a front elevational view of the invention in the ends of a tie rod;

Fig. 24 is a top view along the line 24—24 of Fig. 23, showing the socket and adjustment means on the tie rod; and Fig. 25 is a cross-sectional view of a ball, with elastomer bonded thereon, and socket prior to assembly.

Figure 9:
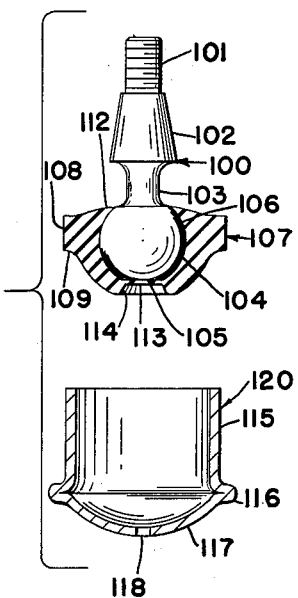
Fig. 9 shows the ball stud and socket and the relationship of the elastomer covering and locator flange of the ball in the free state with respect to the socket.

In view of its use in this specification and in the claims that follow, it should be explained that by the word "elastomer" is meant any rubber-like polymeric material, and the words "rubber" or "rubber-like" may hereinafter be used as equivalents. The term "elastomer" is a general descriptive word for rubberlike, polymeric materials and is sometimes considered as an abbreviation for elasto-polymer and elastic polymer. As herein used, it may be understood to cover the high molecular elastic colloid, natural caoutchouc, synthetic rubber, synthetic natural rubber, as well as the rubber-like materials such as neoprene, butyl rubber and the styrene-butadiene copolymer known as GR–S.

In the ball-stud and socket arrangement which is shown generally in various forms in Figs. 1–8, the numeral 20 designates a ball and stud unit having a threaded end portion 21, a tapered seat or shank portion 22, a neck 23 and a flattened portion 24 on the stud side of the ball interconnecting the neck 23 and the spherical surface of the ball 40. The diameter of the ball across the flat portion 24 will be larger than the largest diameter of the tapered shank portion 22. The contour of the ball will ordinarily be of a circular conformation, although other spherical contours may upon occasion be used for special purposes. Preferably, the top of the ball will have a flattened portion identified generally at 25.

Secured to that portion of the ball above the flattened portion 24 is an elastomer coating layer 26 which is attached to the ball's surface by bonding or other appropriate adhesion, and at the very top of the ball the covering will ordinarily be of a very thin wall thickness as indicated at 27.

The ball-stud thus described is adapted for assembly within a socket or housing indicated generally at 28, having a generally spherical upper wall 35, an initially cylindrical side wall 39, with the interconnection of the portions 35 and 39 being formed by folding the adjacent ends of each portion together as at 36 to form a ridge or circumferentially extending flange. Centrally disposed in the upper wall 35 is an aperture 44.

Referring now more particularly to the free state conformation of the elastomer coating on the ball prior to assembly within the socket as illustrated in Fig. 3, it will be noted that the elastomer coating is of varying wall thickness in different parts of the partially hemispherical surface. Extending circumferentially about the ball and normal to the longitudinal axis of the ball-stud member is a thickened wall portion to be identified as a locator ridge or flange 41. Satisfactory results have been achieved when the ridge or flange 41 has a generally cylindrical outer surface. It will be noted that the elastomer wall making up the circumferential flange 41 is generally on the stud side hemisphere. This will be brought out more clearly in the enlarged view shown in Fig. 9.

The wall thickness of the elastomer layer interconnecting the cylindrical surface of the circumferential ridge or flange 41 and the edge of the flattened portion 24 of the stud member sharply decreases and in conformation may have an annular depression as illustrated at 42, a moderate annular curved extension as at 43 and a feathered end portion which is illustrated more clearly at 112 in Fig. 9.

When the ball-stud element having its elastomer coating secured thereto is assembled within the socket and the socket is closed as will be hereinafter described in connection with Figs. 9–16, in a preferred one-piece socket assembly as illustrated in Fig. 1, the initially cylindrical wall 39 will be conformed inwardly, deforming the rubber about the ball and within the socket and partially closing the open end of the socket to leave only a window 37 which will, of course, obviously have a diameter less than the diameter of the ball.

The cartridge ball and socket combination thus assembled is adapted to fit within an outer support member or seat with the circumferential ridge 36 of the socket being adapted to rest within and upon a step or shoulder 32 of the support member. The support member may have in a laterally extending flanged portion as shown in Fig. 3 an aperture 31 wherein securing means, such as a bolt (not shown), may be located. As illustrated in Fig. 2 the peripheral flange of the support member 30 may be so contoured that additional openings 33 and 34 are provided in which additional fastening elements may be positioned.

Turning briefly now to the deformation of the elastomer, which is accomplished as the layered ball-stud is assembled within the socket, it should here be pointed out that ordinarily such assembly will be made in the presence of a suitable lubricant which allows the elastomer to be deformed in accordance with the complementary surface of the socket in the manner which minimizes undesirable stress concentrations. Air and excess lubricant trapped in the socket during assembly may, of course, be expelled through the aperture 44 in the top of the curved wall 35 of the socket.

The conformation and thickness of the elastomer coating on the ball as described hereinabove is such that when the coated ball is assembled within the socket, the elastomer distributes itself within the casing to achieve a relatively uniform thickness. The thinner portions of the coating, i.e., the feathered portion extending inwardly toward the flattened portion 24 of the ball and the upper portion of the elastomer coating, immediately adjacent the thin top layer 27, will round themselves off in typical fashion as shown particularly at 29 in Fig. 1. It will be obvious that the thicker portions of the upper elastomer wall adjacent the thinner top portion 27 will, on assembly, be rolled inwardly to reduce but not close the open area in the bottom of the casing beneath the aperture 44. It will thus be clear that when relative movement takes place between the ball-stud and casing, under load application, the elastomer is free to move into this top center area as well as in and toward the space provided between the bulged portion 29 and the shank 23.

In the form of the invention illustrated in Figs. 4 and 5, the socket is of a two-piece construction. The upper or cover member 50 has a saucer-like spherical conformation similar to the conformation shown in the upper portion of the socket illustrated in Figs. 1 and 3. In this cover element 50 is provided an aperture 51 and the partial closure by the deformed elastomer wall of the cavity beneath the aperture 51 upon assembly is illustrated at 52. The lower portion 55 of the socket has therewithin a window or aperture 54 and the elements 50 and 55 are adapted to be disposed one against the other, as shown in cross section in Fig. 4. It will, of course, be apparent that circumferential flange means are provided as shown in Fig. 5 so that suitable bolts or other securing means may be placed in aperture 53 to secure the elements together.

Another form of the invention is illustrated in Figs. 6 and 7, in which the socket may be a forging 56, being a part of and attached to a link or arm member 56', having means for attachment to a further assembly by way of apertures 57 and 58, through which securing pins may be disposed. In such a form, the socket 56 will be provided with a lower closure element 59 secured to the socket element as at 60. An aperture 61, similar to that referred to hereinabove at 44 and 51, is shown for the socket element 56 so that trapped air and lubricants may be displaced from the cavity.

In Fig. 8 another form of the invention is shown wherein the upper socket element 62, having a central top aperture 63, is combined with a lower closure element 65 having therein a window or aperture 64. In laterally extending flange portions of the socket elements 62 and 65 are apertures 63' through which bolts or rivets may be disposed to secure the members together or by means of which the combination may be secured to an arm or other means, and in the form shown the outer end of the upper flange element would be formed or cinched around a projecting end of the element 65.

It will be noted in the forms of the invention discussed hereinabove that the structure of the socket elements may be varied for particular adaptation to different linkage design requirements. In the form shown, however, the ball-stud and elastomer coating relationship illustrated in Fig. 3 is adapted to cooperate with the various socket forms. A particular function of the circumferential locator flange or ridge is to aid in the proper positioning of the ball within the socket cavity. Because of the conformation of the elastomer coating upon the ball, it will be apparent that when assembly is achieved within the socket, a portion of the mass of elastomer within the locator flange will, of necessity, be forced upwardly and forwardly around the top of the ball and another portion will be flowed downwardly in contact with the socket encasing the ball to about the edge of the window in the lower portion of the socket, as illustrated at 29 in Fig. 1.

The particular free state conformation of the elastomer coating shown in Fig. 3 is used so that when the deformation forces are encountered upon assembly and closure of the socket, the position of the ball relative to the walls of the socket will be as indicated at Fig. 1. It will be clear that the pressures exerted upon the available surfaces of the upper or top hemisphere of the ball member must be equal to the pressures exerted upon that area of the ball available in the lower hemisphere if the ball is to be retained in the desired relationship, since the elastomer is bonded to the ball. It will, therefore be apparent that the unit pressure in the lower hemisphere, i.e., toward the stud, will be greater than the unit pressure in the upper hemisphere since the latter has a greater area.

By means of such conformation and relationship, the compression of the elastomer within the socket is such that substantial relative movements may be achieved, as, for example, up to as much as ±45°, without creep being occasioned. It will, of course, be apparent that a significant feature of this improvement is that no friction is developed in the device and that there is no requirement of lubrication. The ball will, of course, not move with respect to the elastomer bonded thereto and the socket will not move with respect to the elastomer because of the pressure friction relationship achieved in the deformation of the elastomer in the cavity of the socket. Relative movement between the parts is accomplished by the elastomer acting in shear, and within predetermined operational limits creep is eliminated. The circumferential resistance to movement of the ball with respect to the elastomer due to the bond between them is at least as great, if not greater than the spherical resistance to movement provided by the larger area of the elastomer to socket relationship.

Figure 10:
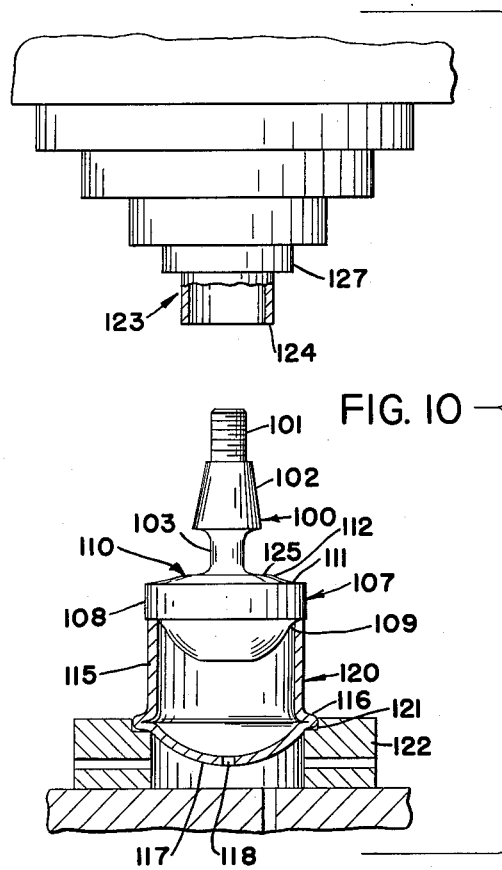
Fig. 10 is a view showing the parts in position in the die and the member ready to insert the ball and bonded rubber member into the socket.
Figure 11:
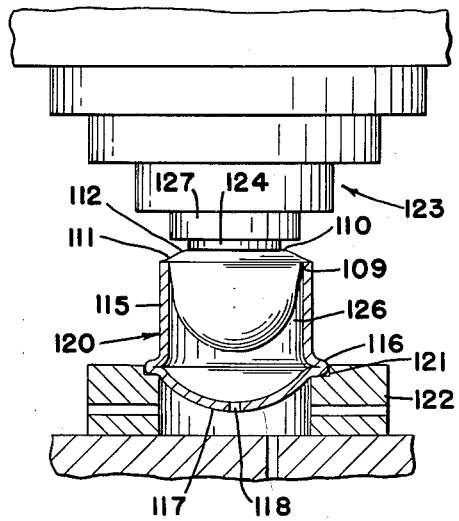
Fig. 11 is a view in a subsequent state of assembly.

The ball-stud, elastomer coating and socket illustrated in Figs. 3 and 9 may be assembled as shown in accordance with the technique depicted in Figs. 10–13. Figs. 9, 10 and 11 show a ball and stud element 100 spaced from a socket 120 into which it is to be assembled. The stud element 100 has a threaded end 101, a tapered shank portion 102, a neck 103, and a ball 104 which may have a flattened top portion 105. Surrounding the ball and bonded thereto over substantially the entire spherical surface 106 and the top surface 105 is a layer of elastomer shown generally at 107, having a thickened wall portion in the form of a circumferentially extending locator ridge or flange 109 which may have a substantially cylindrical outer surface 108 and a generally curved or tapered portion 110 of decreasing wall thickness extending from 108 towards the neck of the stud element. This surface 110 may have an annularly extending groove 111 and an annular projection or ridge portion 112 adjacent to the feathering out of the elastomer onto the spherical surface of the ball. In the portion of the elastomer toward the top of the ball the thickness of the layer decreases, as at 114, so that over the very top of the ball there is only a thin layer of elastomer 113.

In the socket member 120 illustrated in the lower portion of Fig. 9, substantially cylindrical walls 115 are joined to the top or saucer-shaped wall 117 by means of a folded flanged configuration 116. The wall 117 has an aperture 118. The flange or ridge element 116 is particularly useful as a locator and seat device when the assembled ball joint cartridge is combined with various types of eyes or other seating arrangements.

In Fig. 10 a base or support member 122 is provided with a recessed seat or socket portion 121 into which the circumferential flange 116 of the socket 120 is adapted to seat. The elastomer layer coated stud is placed on the socket with the circumferential elastomer flange 109 seated upon the base of the socket. A ram element 123 adapted to come down upon the ball and stud to assemble the elastomer within the socket is shown positioned thereabove. The end 124 of the tubular ram element is adapted to contact the flattened surface 125 of the ball at the junction of the neck 103 and the spherical surface of the ball 104. Fig. 11 illustrates the operation of the ram deforming the locator ridge 109 and forcing the elastomer coated ball into the socket with the formation shown generally at 126.

Figure 12:
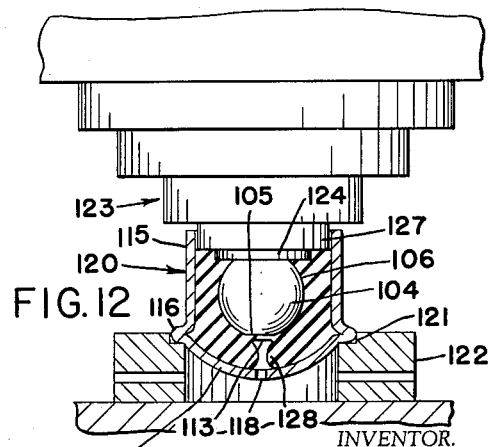
Fig. 12 is the final step of compressing the rubber within the socket.

A further step in the assembly process is shown in Fig. 12, wherein the ring 127 of the ram moves within the cylindrical walls 115 of the socket, compressing the elastomer therewithin, and urges the elastomer forwardly or circumferentially so that the upper wall thickness takes the position as shown at 128. Air or lubricant trapped in the upper cavity may escape through aperture 118. It will be observed that the thin coating 113 of elastomer adjacent the cavity remains over the ball so that dirt and other abrasive material will be shielded therefrom and so that the ball will be protected from corrosion.

In Fig. 13 the ball is shown positioned within the socket not yet closed, with the ram being in the course of removal. Fig. 14 illustrates the approach of a closing die, shown generally at 130, having a bonnet or hood surface 131 adapted to close the cylindrical walls 115 of the socket member around the elastomer layer so that the elastomer and ball will be held within the socket. In this operation a cylindrical shaped ram sleeve element 132 may be positioned internally of the hood or bonnet surface so that the end of the sleeve 132 may contact the ball at about surface 125 within the socket during the final closing operation, as is shown more particularly in Fig. 15.

In Fig. 15 the hood section 131 of the closing die deforms metal walls 115 inwardly to close the socket. Holding member 132 positions the ball within the socket as the bonnet section of the closing die performs a final assembly operation on the socket. The resulting ball joint is shown in Fig. 16. It will be appreciated that various techniques and tools may be employed in the assembly of such joints.

Figure 17:
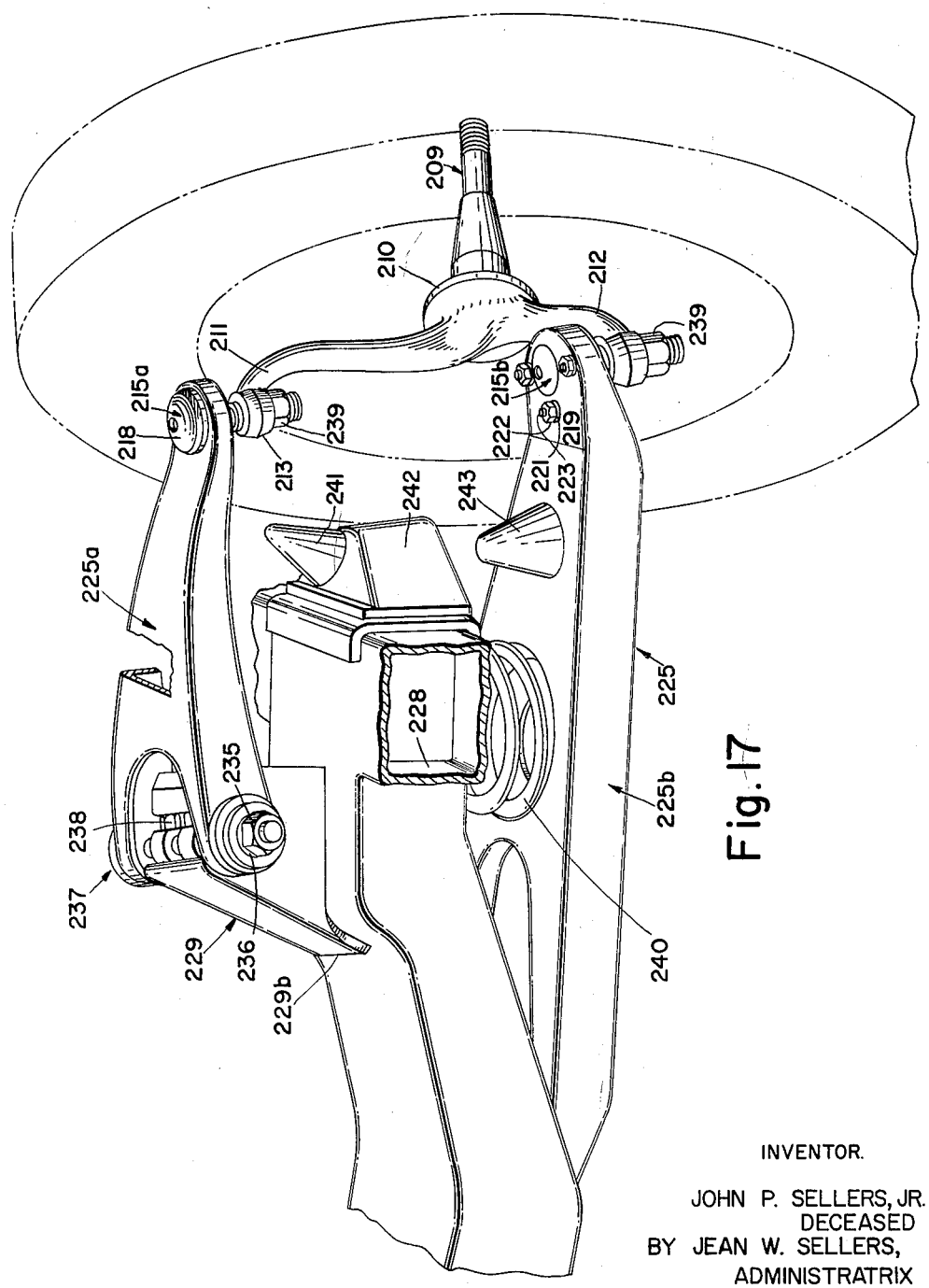
Fig. 17 is a schematic cutaway view showing the use of the invention in an A-frame suspension arrangement.

Illustrations of apparatus in which the subject ball joint invention may be utilized are shown in the suspension system illustrated in Figs. 17–19 and in the steering linkage arrangement shown in Figs. 20–25. In the A frame suspension system illustrated in Figs. 17–19, the invention is used as a means of resiliently interconnecting a spindle and an A frame. In these drawings the reference numeral 209 designates a spindle above which is shown a wheel and tire assembly depicted in dot-dash lines. The spindle 209 has a support structure 210 which in turn has an upper portion 211 terminating in an eye 213 into which a shank of the ball joint is adapted to seat. At the end of the lower portion 212 of the spindle support is an eye portion 214 having an internally tapered seat in which a second ball joint may be located for resiliently interconnecting the lower A frame arm and the spindle support.

In the cross-sectional views of the ball joint shown at the ends of the upper spindle support elements, the assembled elastomer ball joint is generally indicated at 215, with the curved top or upper portion of the socket being identified by the numeral 215a and the lower portion of the socket by the numeral 215b. To the ball 216 of the ball-stud unit there is bonded an elastomer layer 217, and the thus coated ball is contained within the assembly shown at the end of the upper arm in a single-piece, stamped socket 218. In the lower joint assembly the socket is made up of two parts, the upper part being shown at 219 and the lower at 220. A suitable lock washer 221, nut 222 and bolt 223 are shown for securing the ball joint and socket coverings to the outer end of the A frame 225. The A frame to which these units are attached is indicated at 225 and has an upper arm 225a and a lower arm 225b, which are sometimes hereinafter referred to as the upper and lower control arms of the A frame. Frame member 227 is bolted, welded or otherwise secured to the side rail or member 228. An upper support member 229 is shown welded to the frame as at 229a. Frame cross member 227 is welded to the top as at 229b. The upper control arm 225a is secured to the upper arm support member or stamping 229 by means of a rubber-metal, flange type, pivotal connection which is indicated generally at 237. This pivotal connection is secured to the upper control arm by nut 235, compression washer 236 and shaft mounting bolts 238.

Referring now to the upper ball joint illustrated at 215a in Fig. 17, it will be apparent that the threaded end of the stud will be secured within the eye 213 at the end of the spindle support arm by means of nut 239. The tapered shank of the stud below the neck portion 216a thereof is, of course, seated in the eye of the spindle support arm.

Another portion of the vehicular wheel suspension system includes a helical coil spring 240 mounted on the lower control arm of the A frame and passing through the side rail and bearing on the cross frame member. A rubber bumper 241 is mounted upon an appropriate assembly 242, and a lower rubber bumper 243 is secured to the lower control arm 225b adjacent an end thereof.

At the inner end of the lower control arm 225b is shown a pivotal connection comprising a load carrying bracket 245 which is secured to the frame cross member by means of bolts and nuts 247 and 248. In the under side of the framing member is a dimpled or spherical surface 248a. The curvature of this surface, 248a, is designed to approximate that of the curvature provided at the spoon-like end 249 of the inner end of the lower control arm 225. Between load carrying surface 245 and the upper and lower surfaces of the spoon end 249 of lower control arm 225 and surface 248a of the frame are elastomer spacing layers. To the top upper most elastomer layer 250 there is secured a plate and stud, bonded to it and adapted to be used as a locator 251, which may project into a suitable aparture in the frame seat. The lower elastomer layer or support disc, illustrated at 252, has a similar locator lug 252a on the under side thereof, adapted to be disposed through an aperture in the surface 245a of the bracket.

In an A frame suspension system, such as that illustrated in the figures just discussed, the provision of rubber ball joints at the outer ends of the A frame, together with the rubber-metal pivotal arrangement shown at the inner ends of the A frame, eliminates all the remaining lubrication points from the front end suspension system since all metal to metal contacts are avoided. Further the provision of the metal joints at the end of the spindle arms provides the softness for these outer pivot points not heretofore known in the art.

A feature of particular importance in the use of ball joints as indicated in this suspension system is that the ball joints have self centering tendencies. The elastomer in the joint, being deformed, tends to resist turning, and naturally wants to return socket and ball to the initial position in the assembly before turning movement occurs. In power steering applications this returnability or self centering tendency has proven to be extremely advantageous.

It should also be pointed out that in such an application as this in a passenger vehicle suspension system, the upper ball may have to take static loads in the order of 500 pounds p.s.i. on the projected area and up to about 600 pounds p.s.i. on the projected area of the lower ball joint. The maximum load is in the order of five or six times this amount, and the rubber in the joint can take up to 3500 pounds p.s.i. In such an application, the rotation of the elastomer in the joint is up to plus or minus 20° in conical movement and in shear in the horizontal plane, the rubber can accept plus or minus 45°.

Another use to which the subject invention may be advantageously put is in vehicular steering systems, such as in drag link and tie rod assemblies in order to reduce the transmissibility of road shocks through the tires via the steering linkage to the frame. Such applications have been illustrated in Figs. 20–25.

In Fig. 25, for example, is shown a typical ball and stud arrangement wherein the stud has a threaded portion 335, a tapered shank portion 333 and a neck 332 connected to a spherical ball 324. Surrounding the spherical surface of the ball is an elastomer layer having the conformation indicated at 325. As has been explained hereinabove, this ball and elastomer combination is adapted to be fitted into a socket indicated generally at 326 having cylindrical walls 329, a curved bottom 328 and a circumferentially extending flange or ridge 327 interconnecting the walls 338 and 329.

The ball and stud arrangement may be used in the linkage systems illustrated generally in Fig. 20 wherein to a brake backing plate (not shown) is attached at the right end a double steering arm 311 by appropriate means, such as by bolts 312 and 313. One end of the double steering arm is connected to a tie rod 316 at an end 315 thereof by means of a ball joint at 314. At the opposite end 317 of the tie rod 316 is disposed a second ball joint which interconnects a steering arm 319 suitably connected to a brake backing plate (not shown) on the opposite wheel as by bolts 320.

The double steering arm 311 is connected to the drag link 322 through ball joint assembly 321 illustrated in cross section in the enlarged views shown in Fig. 21. At the opposite end of the drag link is another ball joint 323 fastened to pitman arm 324 by appropriate means.

In the enlarged cross section as shown in the left-hand portion of Fig. 21 is a ball and stud arrangement having a ball portion 324 to which there is bonded an elastomer layer 325 with this combination being mounted within a socket assembly which may be a stamping, as shown generally at 326. Extending circumferentially about the outside of the socket is a flange 327. The socket illustrated in Fig. 25, when completed as shown in Fig. 21, has the cylindrical walls formed inwardly as at 330 so that the ball and the elastomer coating are suitably contained within the socket and the neck 332 of the stud is contained within the window 331. The tapered shank 333 of the stud is seated within a complementary eye at the end of the double steering arm and secured therein by means of a nut 334 attached to threaded section 335 of the stud. A cotter pin or other appropriate fastening means may be used to secure the nut to the stud. The end of the double steering arm 337 is shown in cross section.

The drag link unit 322 as illustrated in the drawings is tubular in contour and has an open seam 338 extending from one end 339 to the opposite end 340 and within the length of the drag link the seam is rotated 90° so that the eyes at the ends of the drag link have this relationship one to the other. The seam could, of course, be rotated to a greater or lesser degree with a similar relationship resulting in the eyes at the end of the drag link. The ends of the drag link unit are formed as by stamping with a generally cylindrical aperture, socket or eye 341 in which the subject ball joint may seat as illustrated particularly in Figs. 21 and 22. One or both ends of the drag link may be formed as at 342 with a deep flange and drawn sides.

In Figs. 23 and 24 are illustrated similar components of a tie rod with the end of the tie rod 317 having a ball joint attached thereto in socket 345 as shown in cross section and said end 315 of the tie rod having a ball joint shown generally in elevation. Appropriate securing clamps 343 and 344 are shown on the tie rod.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An elastomer ball joint assembly including a stud member provided with a ball at one end, a socket member surrounding said ball in radially spaced relationship thereto, a window in the socket through which the stud projects, the window and stud defining a clearance therebetween of sufficient magnitude to allow relative movement between the stud and the socket without allowing the ball to pass through the window, an elastomer layer surrounding the ball and bonded firmly thereto, the layer being radially compressed between the socket and ball to mount the same together resiliently, the layer, in the free state, being provided with a zone of reduced thickness diametrically opposite the stud, the zone defining a flow chamber with the socket, when the joint is assembled, and portions of the layer contiguous with the zone being deformed thereinto, an amount dependent upon the magnitude of the compressive forces acting between the ball and the socket.

2. A joint as defined in claim 1 in which the elastomer layer is of unitary construction and in which the socket is provided with an aperture in communication with the chamber in order to allow air to pass therefrom as said layer is compressed.

3. An elastomer ball joint assembly including a stud member provided with a ball at one end, a socket member surrounding the ball in radially spaced relationship thereto, a window in the socket through which the stud projects, said window and stud defining a clearance therebetween of sufficient magnitude to allow relative movement between the stud and socket without allowing the ball to pass through the window, an elastomer layer surrounding the ball and bonded firmly thereto, the layer being radially compressed between the ball and the housing to resiliently mount the same together, the layer being characterized in the free state thereof by a ridge of considerable bulk extending circumferentially therearound adjacent the stud member normal to the axis of the stud member, the ball being covered by the layer substantially to the zone of juncture thereof with the stud member, the thickness of the layer decreasing from the stud side of the ridge toward the zone of juncture, the ridge in the free state having its cross-sectional area, in a plane perpendicular to the axis of the stud, greater than the cross-sectional area, in the same plane, between the outer surface of the ball and the inner surface of the socket when the ball and socket are assembled, whereby the ridge may be radially compressed when the layer is assembled in the joint to thereby flow adjacent the surface of the ball toward the zone of juncture.

4. A joint as defined in claim 3 in which the layer is symmetrical around the axis of the stud.

5. A device as defined in claim 4 in which the layer is provided in the free state with a zone of reduced thickness diametrically opposed to the stud, the zone forming a flow chamber with the socket, when the joint is assembled.

6. A device as defined in claim 5 in which the socket is provided with an air escape aperture in communication with the chamber.

7. In an elastomer ball joint, a ball having a stud member projecting therefrom, a layer of elastomer surrounding said ball and firmly bonded thereto and having in the free state an assembly locator ridge portion extending circumferentially therearound adjacent the stud member and with said ridge being normal to the longitudinal axes of the stud member, a socket member surrounding said elastomer layer and ball, the conformation of the elastomer upon the ball in the free state before assembly into the socket member being such that the locator ridge portion has a greater cross-sectional area in a plane therethrough and perpendicular to the axis of the stud member than the cross-sectional area, defined in the same plane, between the surface of the ball and the inner surface of the socket after assembly, whereby upon assembly of the elastomer and ball into the socket member the elastomer in the ridge portion is radially compressed and is flowed both toward the stud member and toward the portion of the ball opposite therefrom, resulting in a substantially uniform distance wall thickness.

8. The ball joint of claim 7 in which the elastomer layer is substantially symmetrical about the longitudinal axis of the ball and stud.

9. The ball joint of claim 7 in which the portion of the elastomer layer between the locator ridge portion and the stud member has a sharply decreasing cross-sectional area in parallel planes taken progressively in the direction toward the stud member and perpendicularly to the longitudinal axis thereof.

10. A ball and socket joint assembly comprising a socket member having an arcuate interior wall surface, a stud member having a substantially ball-like head joined thereto at one end, the substantially ball-like head being positioned within said socket member and spaced from said arcuate interior wall surface of said socket member with the stud member extending outwardly through an opening in said socket, an elastomer layer received on said substantially ball-like head and covering the same substantially to the zone at which the substantially ball-like head joins the stud member, said elastomer layer being bonded to said substantially ball-like head over the entire surface thereof, said layer being radially compressed between the socket member and the substantially ball-like head, said elastomer layer when bonded upon said ball-like head and before insertion in the socket member having a circumferentially extending ridge portion having a greater external diameter than the inner diameter of the socket member positioned adjacent the stud, and with said elastomer layer having in its free state a greater volume in the portion thereof covering the hemisphere-like portion of the substantially ball-like head adjacent the stud member than in the portion thereof covering the hemisphere-like portion thereof opposite the stud member so that when said ball-like head is assembled into said socket member the elastomer is displaced both towards the stud member and towards the polar area of the hemisphere-like portion co-axial with and opposite the stud portion to space the ball-like head from the socket member with substantial uniformity.

11. A method of assembling a ball having a stud projecting therefrom, the ball having a layer of elastomer bonded to the entire surface of the ball thereof and the layer of elastomer in the free state being provided with a locator ridge portion extending circumferentially therearound adjacent the stud member and normal to the longitudinal axis thereof, into a socket having a curved bottom portion and a generally cylindrical wall terminating in an edge lying in a plane generally perpendicular to the axis of the stud and having a small aperture in said bottom portion and wherein the diameter of the elastomer layer upon said ball is greater than the inside diameter of said socket comprising the steps of abutting said locator ridge portion and said edge to arrange the ball, the stud member and the socket in coaxial relationship, forcing the elastomer covered ball into the socket, deforming the elastomer layer radially to flow the same both toward the stud member and toward the portion of the ball opposite therefrom, expelling air trapped in the socket during the assembly operation through the aperture in the bottom portion of the socket and partially closing the end of the cylindrical walls of the socket inwardly to further deform and compress the elastomer in contact therewith so that said elastomer separates said ball from the walls of said socket by a wall thickness that is substantially uniform thereabout.

References Cited in the file of this patent

UNITED STATES PATENTS

| | | |
|---|---|---|
| 1,943,631 | Skillman | Jan. 16, 1934 |
| 1,960,956 | Riedel | May 29, 1934 |
| 1,990,016 | Alden et al. | Feb. 5, 1935 |
| 2,274,417 | Katcher | Feb. 24, 1942 |
| 2,292,675 | Thiry | Aug. 11, 1942 |
| 2,589,820 | Konchan | Mar. 18, 1952 |